United States Patent

Main

[11] 4,042,149
[45] Aug. 16, 1977

[54] LIQUID PUMP AND METERING SYSTEM

[75] Inventor: Don R. Main, Broken Arrow, Okla.

[73] Assignee: Combotronics, Inc., Tulsa, Okla.

[21] Appl. No.: 589,461

[22] Filed: June 23, 1975

[51] Int. Cl.² ............................................. B67D 5/32
[52] U.S. Cl. ................................... 222/40; 222/76
[58] Field of Search .............. 222/26, 40, 25, 28, 222/31, 36, 54, 71, 72, 73, 76

[56] References Cited

U.S. PATENT DOCUMENTS

| | | | |
|---|---|---|---|
| 3,040,573 | 6/1962 | Berck | 222/72 X |
| 3,605,741 | 9/1971 | Spencer | 222/71 X |
| 3,857,552 | 12/1974 | Ohlson | 222/54 X |

*Primary Examiner*—Stanley H. Tollberg
*Assistant Examiner*—Hadd Lane
*Attorney, Agent, or Firm*—Head, Johnson & Chafin

[57] ABSTRACT

A liquid pump and metering system for difficult-to-handle liquids where accurate metering and control is required. The system selectively meters the flow of liquids and employs a digital counting processor with at least one pulse deletion subsystem for correcting flow rate and total flow in accordance with environmental variables and equipment calibration requirement.

14 Claims, 8 Drawing Figures

LIQUID PUMP AND METERING SYSTEM

BACKGROUND OF THE INVENTION

1. Field of the Invention

This invention relates to liquid pumps and meters and more particularly, but not by way of limitation, to a pump and metering system for pumping and measuring liquid flow in a hot asphalt plant for both the drum mix type and conventional type plants.

2. Description of the Prior Art

By way of background, when asphalt is used for paving projects it is necessary that it be mixed with various amounts of aggregate in order to obtain the proper mixture for its intended use. The mixing and application of asphalt requires that the asphalt be heated. The pumping of asphalt into a mixing plant creates a problem in that unless the hot asphalt is kept continuously moving through the pumping tubes or pipes it will harden and eventually plug up the pipes. Therefore, it is necessary to provide a bi-directional or three-way valve located at the point of mixing and having one of the outlets of the valve being reconnected back to the hot asphalt tank. In this way when the pumping system is pumping asphalt into the mixer and the mixer requires a shut-down of the asphalt being pumped in, it is necessary that this three-way valve be switched so that the asphalt may be continuously pumped back into the asphalt tank so that the hot asphalt will continuously circulate through the pipe. An asphalt plant of this general type is described in the patent to Shearer, U.S. Pat. No. 3,832,201, issued in 1974 and entitled "Process For Making Asphalt Paving Compositions."

It is often the case that the asphalt is purchased from a separate contractor in road building projects and therefore it is necessary to accurately meter or measure the amount of asphalt actually being put into the mixer. Therefore, it is necessary that the metering system be operably connected to the three-way valve in a manner so that it measures the total flow of asphalt therethrough only when the asphalt is actually being moved into the mixer.

The measuring of the amount of asphalt being used also creates a problem since the volume of asphalt per weight or specific gravity varies in accordance with the temperature of the asphalt. Three major types of asphalt, each having different temperature characteristics, have been categorized as (1) emulsified, (2) group zero, and (3) group one. Therefore, a volume metering means, to be accurate, must compensate for the temperature of the specific type of asphalt being measured thereby.

Most systems now on the market utilize a single positive displacement group. Those systems meter directly from the rotation of that pump. The result is acceptable providing there is an adequate supply of asphalt in the tank. However, it is often the case that air gets in the line or the asphalt tank becomes empty and the motor registers more than the actual amount of asphalt delivered into the mixer.

Therefore, in present day systems there are two basic sources of error, the first being the failure to correct the temperature variants which relates to compensation for the type of asphalt being pumped, and the error introduced by air getting into the pumping lines.

SUMMARY OF THE PRESENT INVENTION

The present invention comprises a pump and associated positive displacement metering system that has been especially designed to overcome the above disadvantages present in the prior art systems.

The present invention comprises a first positive displacement pump for pumping the hot asphalt, a second positive displacement pump downstream of the first pump whereby the rotating portion thereof cannot be moved except by the positive movement of liquid therethrough. Stated another way, the rotating portion of the second pump cannot be substantially moved by air alone, but only by liquid flowing therethrough. The second pump is utilized as the meter for the flow of asphalt and is operably connected to a digital metering system.

The digital metering system receives electronic pulses from the metering pump, the number of which are directly proportional to the volume of liquid passing through said metering pump. The digital metering system is also connected to a thermocouple device located adjacent to said metering pump and employs a pulse deletion subsystem to correct the volume flow to the standard asphalt volume at a specified temperature. Another count deleting system is provided for the purpose of calibrating the metering pump.

The digital metering system is provided with a rate of flow circuit and a fail-safe totaling circuit. The system is further provided with an alarm system which serves to substantially isolate equipment failure and in certain cases to shut down the system when the fail-safe mode is required.

DESCRIPTION OF THE DRAWINGS

Other and further advantageous features of the present invention will hereinafter more fully appear in connection with a detailed description of the drawings in which.

DETAILED DESCRIPTION OF THE PREFERRED EMBODIMENT

Figure 1:
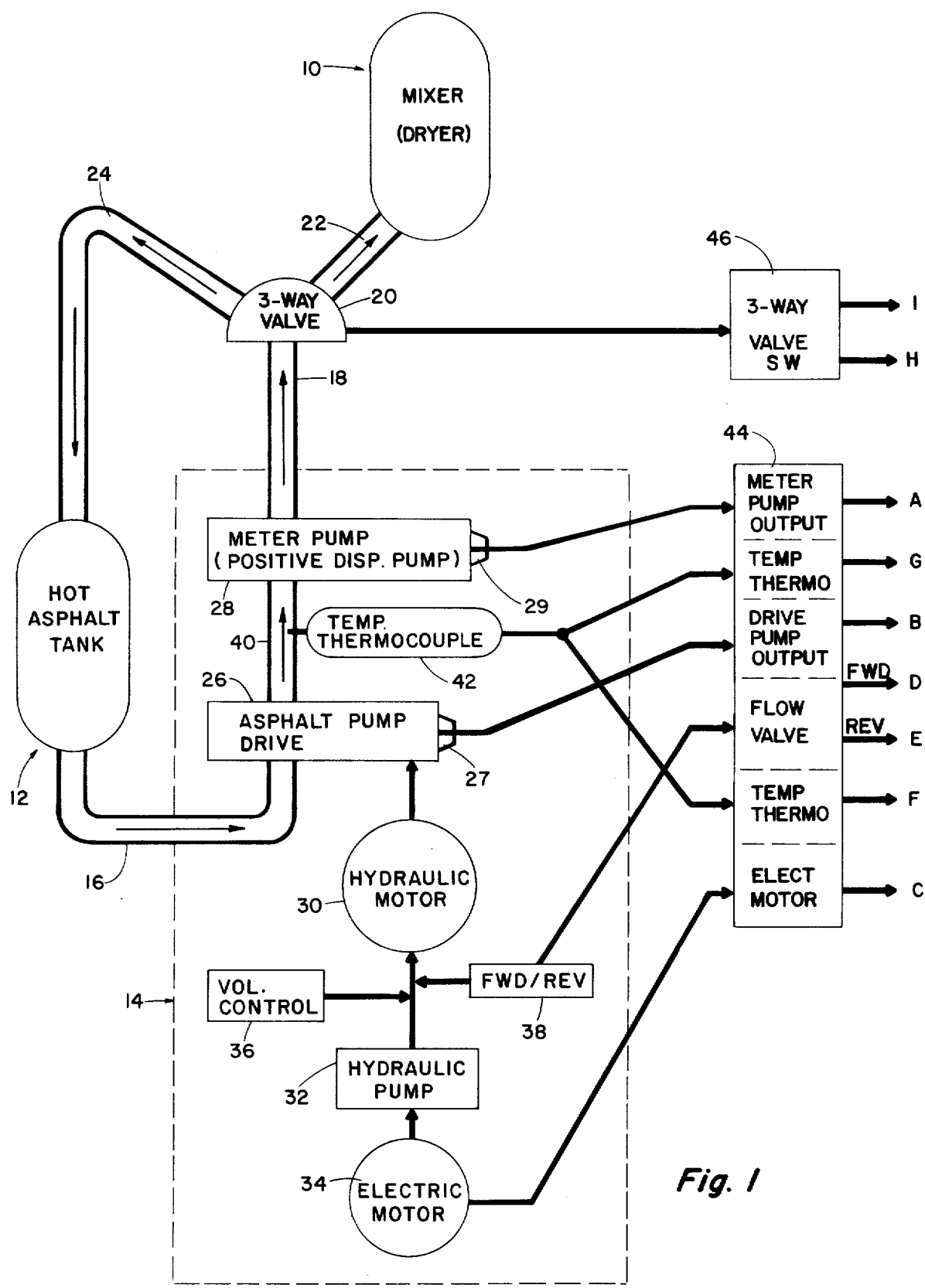
FIG. 1 is a functional block diagram depicting the pumping system in relation to a hot asphalt plant or mixer.

Referring now to FIG. 1, reference character 10 generally indicates a hot asphalt drum mix plant, the details of the plant and aggregate mix system being omitted since it does not represent a part of the invention per se. Reference character 12 indicates a hot asphalt tank which in many cases is mobile and is brought in by truck to the mixing plant.

The pumping and metering device generally indicated by reference character 14 is connected by suitable pipe 16 to the hot asphalt tank 12. The output of the pump and meter device 14 is connected by means of a pipe 18 to the three-way valve 20 which is connected at a point adjacent to and as a part of the mixer or the hot asphalt mix plant 10. The valve 20 has two outlets 22 and 24, outlet 22 being connected directly to the mixer and outlet 24 being connected back to the hot asphalt tank 12.

The pumping and metering device 14 generally comprises a pair of oppositely connected positive displacement pumps 26 and 28. The pump 26 is driven by a hydraulic motor 30. The hydraulic motor 30 in turn is driven by a hydraulic pump 32 which receives its power from an electric motor 34. The speed of the hydraulic motor 30 is controlled by a volume control mechanism 36 which controls the volume of hydraulic fluid between the pump 32 and the motor 30. Hydraulic switching means 38 is also provided in order to reverse directions of the hydraulic motor 30. As hereinbefore stated, the hydraulic motor 30 acts as a drive mechanism for the positive displacement pump 26 which actually pumps the hot asphalt out of the hot asphalt tank 12 and through an interconnecting pipe 40. The interconnecting pipe 40 is provided with a suitable temperature probe means 42 for measuring the temperature of the hot asphalt at the inlet of the positive displacement metering pump 28.

The positive displacement pump 28 used for metering is connected directly to the asphalt line 40 and is located in close proximity to the asphalt drive pump 26. The positive displacement metering pump 28 is free-wheeling and is driven solely by the liquid asphalt that is being passed therethrough. It will not respond to air but to liquid only. The output of the metering pump 28 is directly connected to the three-way valve 20 by means of the pipe or tube 18. Each of the positive displacement pumps 26 and 28 are provided with a pickup head transducer 27 and 29 respectively which operates by virtue of a gear means which produces rotation when the pumps 26 and 28 are being rotated. Naturally the amount of asphalt being moved by the pump 26 is dependent on the speed of the pump 26 and the supply of hot asphalt in the tank 12. However, the rotation of the metering pump 28 is directly dependent on the volume of asphalt being moved therethrough since it does not have an external drive source. This provides for more accurate volumetric measuring of the asphalt being passed therethrough. However, in order to obtain an actual or more accurate measurement of the weight of the asphalt being moved therethrough, temperature compensation must be made as hereinbefore set forth.

The accurate measurement of the amount of asphalt being moved through the system is provided by an electronic counting circuit and associated display means, as will be hereinafter set forth and as shown in FIGS. 2, 3 and 6 through 8.

Figure 2:
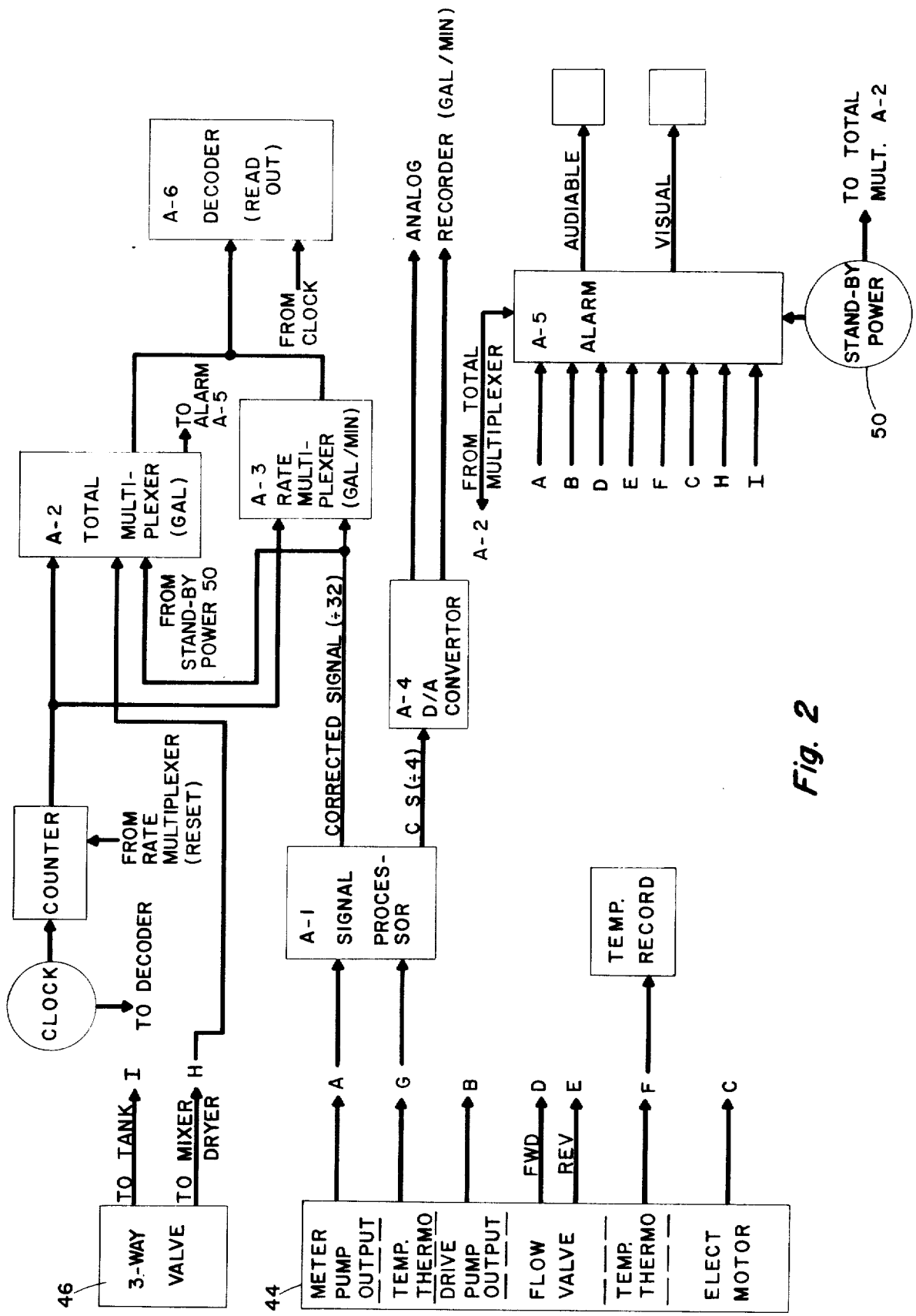
FIG. 2 is a functional block diagram depicting the digital metering system including counter and display means.

The block diagram of FIG. 2 generally indicates the operation of the digital metering system for accurately measuring the true amount of asphalt being pumped from the hot asphalt tank 12 into the mixer-dryer 10. As hereinbefore stated the pickup head or transducer 29 located on the meter pump 28 is connected through a suitable connector means 44 to a signal processor circuit A-1 through connection A and produces a series of electrical pulses, the number of pulses per second being directly proportional to the flow rate of hot asphalt through the meter 28. Temperature measurement from the thermocouple means 42 is provided through connection G to the signal processor A-1 for compensating the volume output in accordance with the temperature in a manner that will be hereinafter set forth. The output of the signal processor A-1 is in digital form and the signal which has been corrected by temperature information is then provided to a totaling multiplexer circuit A-2. This corrected signal is also provided to a rate-of-flow multiplexer circuit A-3.

The signal processor A-1, also for a different purpose, provides a corrected output signal to a digital-to-analog converter A-4 whereby the corrected signal may be processed and displayed by an analog output for a meter or the like, or to an analog recorder which records the rate of flow of the material passing from the hot asphalt tank 12 into the mixer 10.

The output of the totaling multiplexer A-2 and the flow rate multiplexer A-3 is provided to a decoder circuit A-6. The decoder circuit is directly connected to the display means which normally constitutes a plurality of digital read-out lamps for displaying either rate of flow as in gallons per minute or total flow in gallons. It is noted that the gallons referred to in the display or read-out section are actual gallons which flowed through the metering pump 28 corrected by the temperature of the hot asphalt at the metering pump 28.

When the three-way valve 20 is in a position to pass asphalt through the pipe 22 into the mixer 10 a signal is provided at the terminal H of the three-way valve switch 46, said signal from terminal H being fed directly into the totaling multiplexer A-2 in order to enable A-2 to count the total corrected volume of asphalt being moved into the mixer 10. On the other hand, when the three-way valve 20 is switched to move the asphalt through the line 24 back to the hot asphalt tank 12, a signal is provided at the output I of the three-way valve switch 46 and it is removed from terminal H which disables the totaling circuit A-2.

An alarm circuit A-5 is provided to indicate various modes of failure of the system to the operator. The alarm is provided with an audible buzzer 45 or the like and a visual alarm 47 such as red light or blinking red light indicating failure in the system.

The following are a few of the system failures that may be processed through the alarm circuit A-5:

1. When the asphalt in the hot asphalt tank 12 becomes low, an alarm circuit may be provided when the difference between the ouput A of the meter pump 28 and the output B of the drive pump 26 exceeds a designated amount.

2. An alarm is provided when the three-way valve 20 fails to seat properly. The alarm circuit A-5 receives this information from the outputs H and I of the three-way valve switch 46.

3. A loss of power alarm is provided, said alarm being operated by a secondary or stand-by battery power source 50 which also holds the total gallons registered in memory in the circuit A-2.

4. An alarm is also provided when the asphalt temperature either becomes too high or too low outside of a pre-determined operating range. This status is provided from the output of the temperature thermocouple 42 through the signal terminal F.

5. A signal is provided to the alarm circuit A-5 through a terminal C which monitors the starter motor relay of the electrical motor 34. If the relay is tripped while the asphalt is being delivered to the drier, an alarm will sound indicating that the pump motor is off.

6. By monitoring the position of the forward and reverse switch 28 of the hydraulic drive system, position status may be provided to the alarm means A-5 through the output terminals D and E. The forward and response signals through D and E are then coupled with the input H from the three-way valve switch 46 in a manner so that an alarm is sounded when the switch 38 is in a reverse position and the valve 20 is positioned to move asphalt into the mixer.

The metering pump 28 in addition to being provided with a digital pickup head may also be provided with an analog head (not shown) to produce a voltage level proportional to the r.p.m. of the metering pump which in turn is proportional to the volume of material being pumped therethrough. However, the accuracy of the meter would be decreased at very low r.p.m. using analog as opposed to digital.

Figure 3:
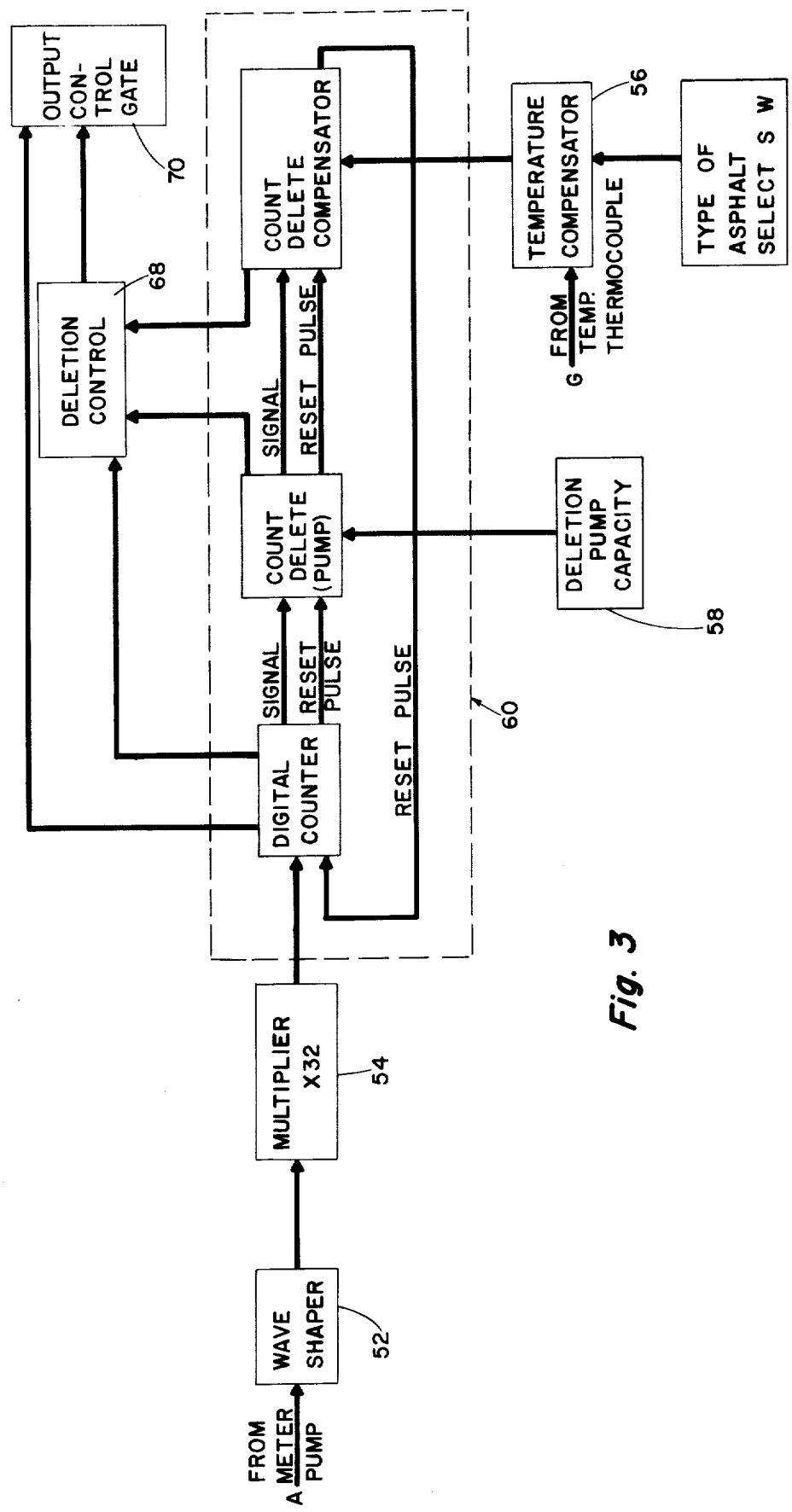
FIG. 3 is a functional block diagram of the signal processor means.

Referring now to FIG. 3 the signal processor A-1, a wave shaper circuit 52 is provided which filters out noise which may be on the pickup lines and adjusts the amplitude of the pulses to be compatible with the rest of the signal processor circuit. The pulses received from the metering pump 28 via terminal A are then processed through a multiplier circuit 54. A temperature correcting circuit 56 is also provided on the signal processor A-1 for correcting the volume indication received by the meter pump in accordance with the temperature input received by the thermocouple 42. A similar pump volume correction circuit 58 is also provided. The corrections made by the correcting circuits are made to the multiplied pulse train by a pulse deletion system generally indicated by reference character 60. The multiplication of the frequency of the input pulses allows the temperature correcting circuits to correct on fewer impulses.

The pulse deletion system 60 is provided with output control gates, the function of which are to pass a predetermined number of pulses based on the rotational speed of the meter pump 28 and the temperature indication from the thermocouple 42 so that the predetermined number of output pulses will equal one unit volume of asphalt regardless of the temperature of the asphalt in a manner that will be hereinafter set forth. The pulse train is also corrected by way of the calibration input 58 for pumping capacity.

Figure 5:
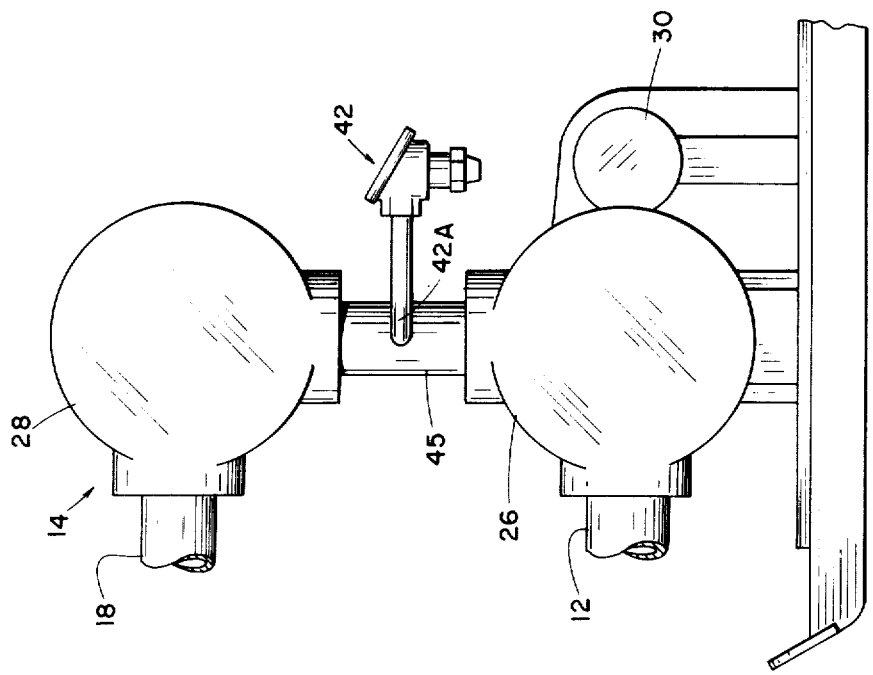
FIG. 5 is a side elevational view of the pump and meter of FIG. 4 taken at 90° thereto.
Figure 4:
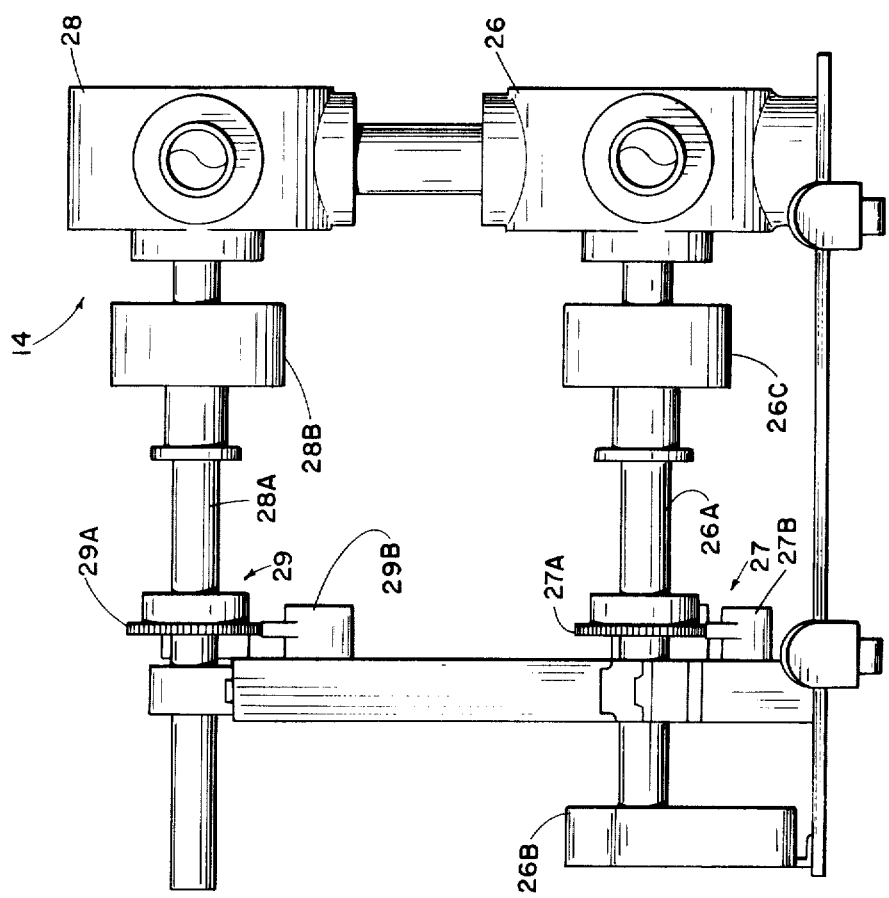
FIG. 4 is a side elevational view of the pump and meter and associated components.

Referring now to FIGS. 4 and 5 reference character 26A denotes the rotating shaft of the asphalt drive pump 26. The shaft is connected by a chain drive means 36B to the hydraulic motor 30. The shaft is provided with a subpumping means 26C for circulating hot oil through the pump 26 to prevent clogging thereof by the asphalt being pumped therethrough. The pickup 27 comprises a gearing means 27A which is attached to the rotating shaft 26A for rotation therewith and a suitable transducer 27B operably connected thereto whereby the electrical output of the transducer 27B is provided to the connector 44 at terminal B.

The metering pump 28 likewise has a rotating shaft 28A and an oil heater circulation means 28B which are substantially identical to the corresponding items in the drive pump 26. The metering pickup means 29 generally comprises a gear 29A which is attached directly to the rotating shaft 28A for simultaneous rotation therewith and a corresponding transducer 29B for transmitting pulses through the connector 44 at terminal A as hereinbefore set forth.

The thermocouple device or probe means 42 generally comprises a sensor 42A such as an RTD probe which is sensitive to temperature changes in the asphalt moving through the pipe segment 40 from the drive pump 26 to the metering pump 28. The probe means 42 may also be provided with the necessary circuitry (not shown) in order to properly interface with the digital metering system.

Referring now to the drawings at FIGS. 6, 7 and 8 the circuitry for the signal processor will be described by utilizing the pulse count values which have been selected for one particular system. It is noted at this point that various pulse counts may be used which is within the spirit and scope of this signal processor system.

The pickup head or transducer 29B is located on the metering pump 28 transmits a series of pulses depending on the revolution of the rotating shaft 28A of the pump 28. The particular transducer 29B and gear 29A have been selected so that 72 pulses are produced at terminal A for each revolution of the metering pump shaft 28A. This series of pulses is fed into the wave shaper circuit 52 to the base of an NPN type transistor Q1 through a voltage divider represented by resistors R1 and R2. The collector of the transistor Q1 is attached to a D.C. power source V through a resistor R3. The emitter of the transistor Q1 is connected to ground. The collector of the transistor Q1 is also connected to the base of a second PNP type transistor Q2 through a resistor R4. The emitter of the transistor Q2 is connected to a voltage source and the collector thereof is connected to ground through a resistor R5. The circuitry hereinbefore described serves to amplify the pulses from the metering pump transducer 29B and to also square the pulses to be compatible with subsequent circuitry. The output of the wave shaper circuit 52 is provided from the collector of the transistor Q2 and is fed directly to the multipler circuit 54.

The output of the wave shaper circuit 52 is fed directly to one input terminal of a NAND gate U1, the other input terminal thereof being connected to a voltage source. The output of the NAND gate U1 is connected to a voltage source through a capacitor C1 and a resistor R6 connected in series therewith. The output of the NAND gate U1 is also connected to both input terminals of a second NAND gate U2, the inverted output of which is connected to a voltage source through a second capacitor C2 and resistor R7. The output of the NAND gate U1 is also connected to one input of a NAND gate U3 through the capacitor C1 and the output of the NAND gate U2 is likewise connected to the opposite input terminal of the NAND gate U3 through the capacitor C2. The logic circuitry made up of the NAND gates U1, U2 and U3 serve as a frequency doubler in that a spike pulse is produced out of the NAND gate U3 for each change in voltage accompanied by the square wave pulse from the wave shaper circuit 52 (two for each pulse). This pair of spike pulses from the NAND gate U3 are fed directly into the reset port of a binary counter BC1.

The binary counter BC1 has an output signal for enabling a free running clock oscillator which feeds directly back into the binary counter BC1 until 16 pulses have been emitted at which time the binary counter BC1 disables the clock until the receipt of the next spike pulse from the NAND gate U3. The enabling output of the counter BC1 is connected to one input terminal of a NOR gate U4 through a resistor R10 and a diode D1 connected in parallel therewith. The output of the NOR gate U4 is connected to both input terminals of a NAND gate U4 and is provided with a feedback from the output of the NOR gate U4 to the opposite input terminal thereof through resistors R8 and R9. The junction between the resistors R8 and R9 is connected to the output terminal of the NAND gate U4 through a capacitor C3. The output of the NAND gate U4 is connected to the binary counter BC1 in order to fill the counter with pulses on being enabled.

The output of the NAND gate U4 is also connected to the input of the counter and deletion circuit 60. It is also noted that the first input terminal of the NOR gate U4 is connected to ground through a capacitor C4. Therefore, for every pulse into the system at A, 32 pulses are emitted from the multiplier circuit 54.

The digital counter and deletion system 60 generally comprises a digital counter 62, a pump count delete circuit 64 and a temperature compensator count delete circuit 66. The count deletion is controlled by a deletion control circuit 68 which operates on an output control circuit 70. The output of the output control circuit 70 represents a series of pulses directly proportional to the volume of asphalt being moved through the metering pump 28 after having been corrected for the pump capacity calibration and the temperature based on the type of asphalt being moved therethrough. This pulse train is then passed through output circuitry before being introduced into the totaling multiplexer A2 and the rate of flow of the multiplexer A3. The pulse train through the control circuit 70 is fed directly into a binary counter BC2 or divider circuit the output of which feeds into the rate multiplexer circuit A3. The pulse train through the binary counter BC2 is likewise fed to the optional digital-to-analog converter circuit A4. Another output of the binary counter BC2 is fed directly into a decade counter DC1, the output of which is fed into one input terminal of a NAND gate U6. The output of the NAND gate U6 is fed directly into the totalized multiplexer A2. The gate U6 is enabled by an input from terminal H which is directly connected to the three way valve switch 46 indicating that asphalt is moving into the mixer drier 10.

Figure 6:
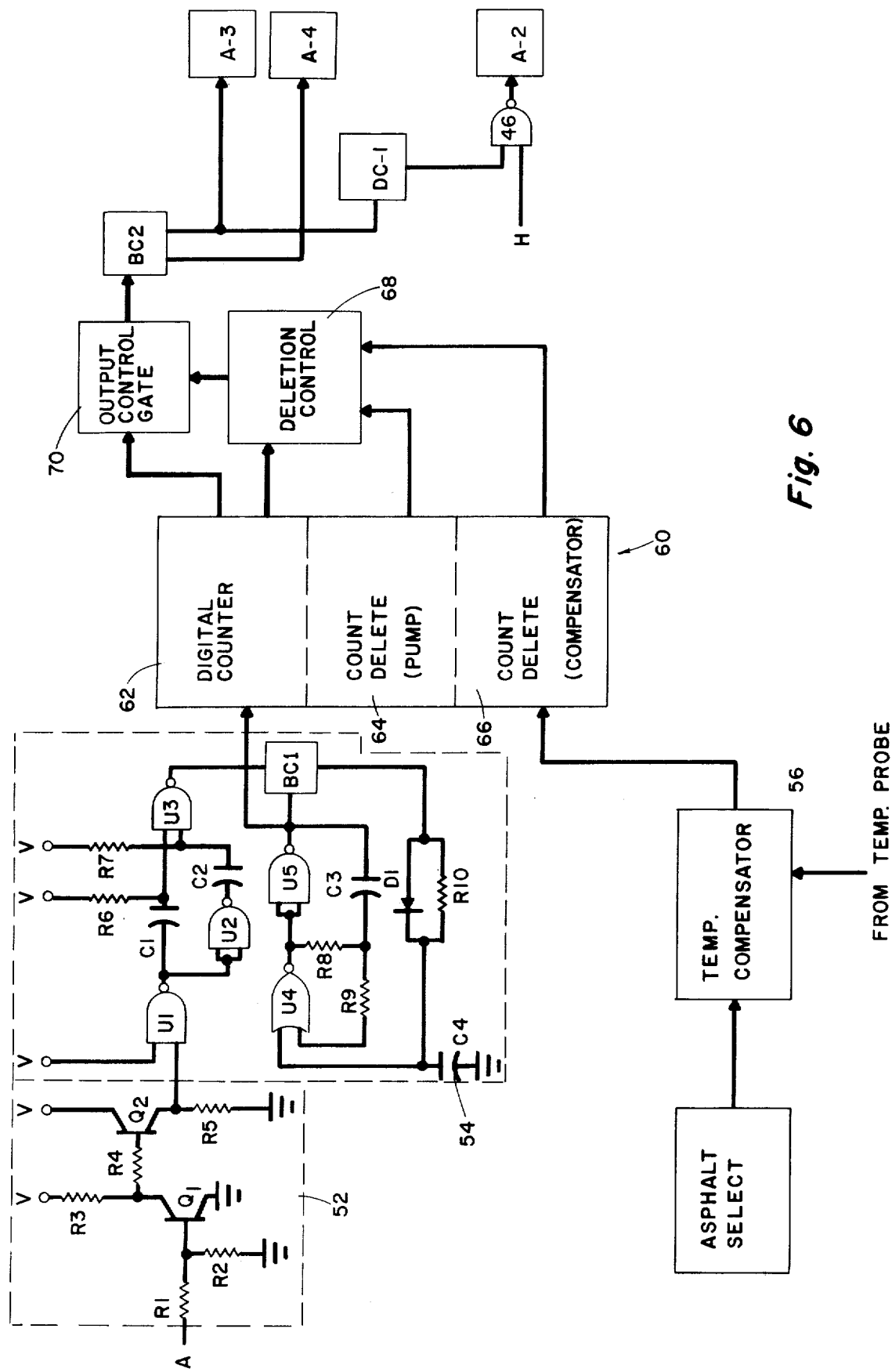
FIG. 6 is a functional block diagram of a portion of the digital metering system showing the input circuitry and output circuitry in detail.
Figure 7:
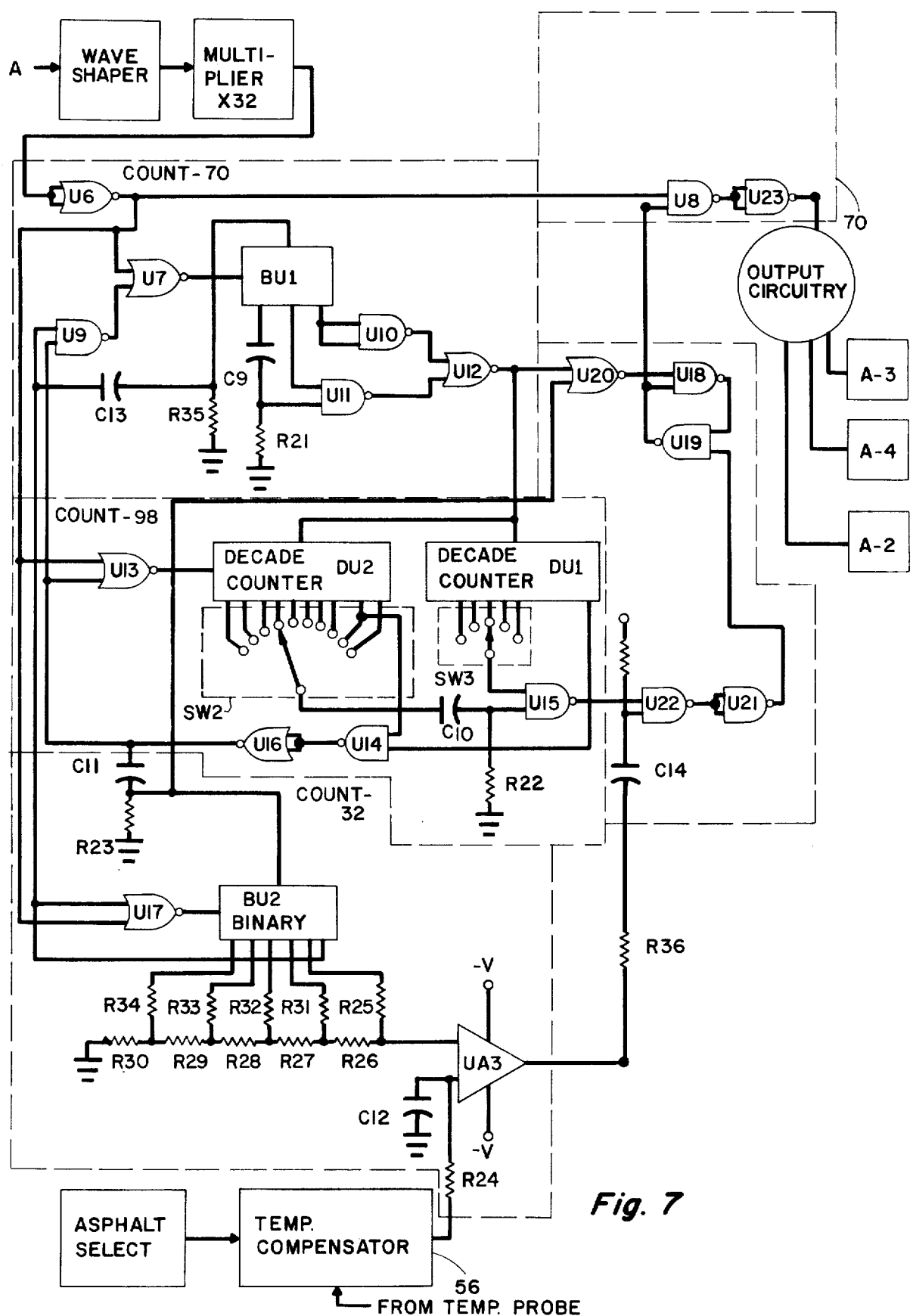
FIG. 7 is a functional block diagram of the elements of FIG. 6 depicting the detailed circuitry of the counting and deletion means.
Figure 8:
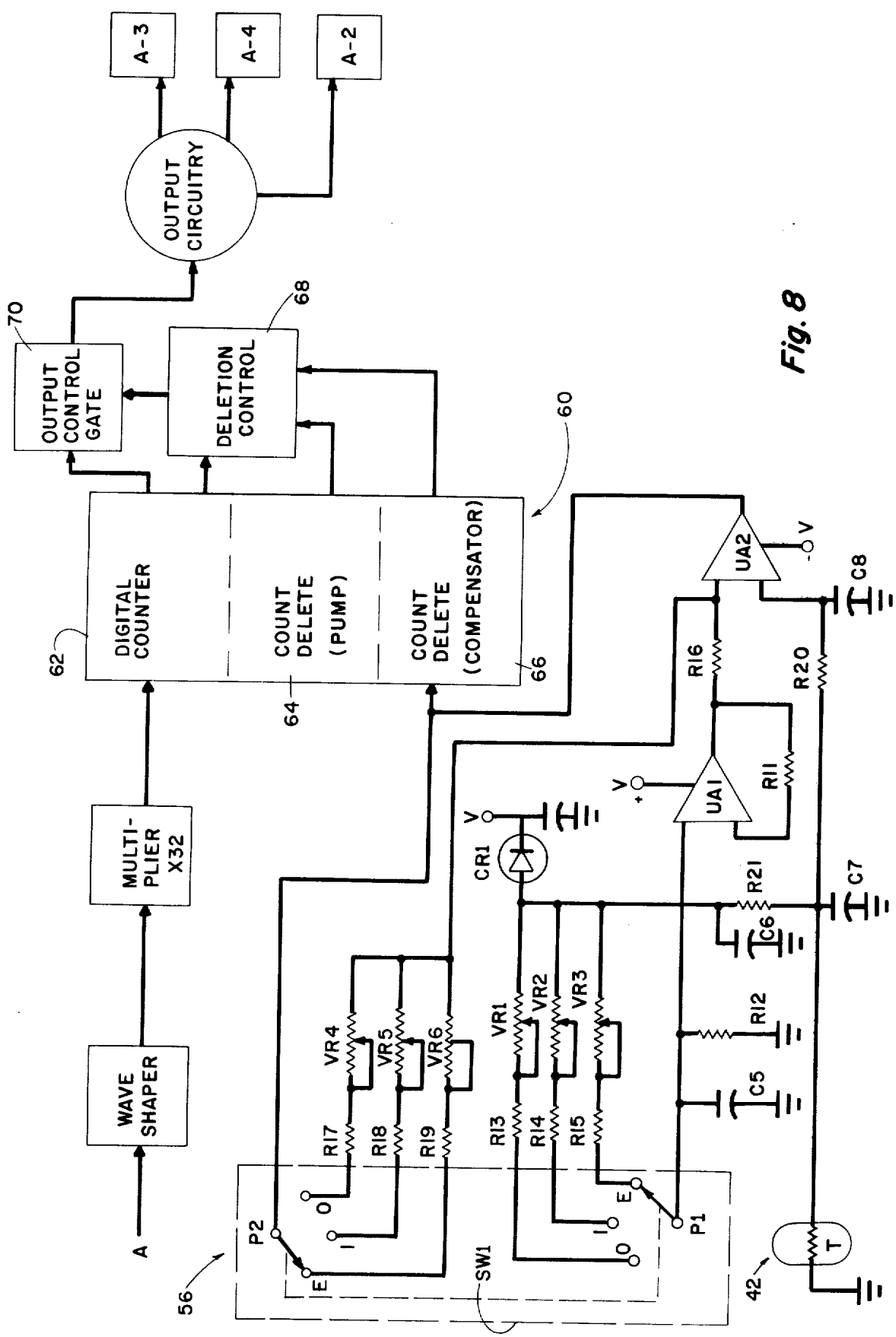
FIG. 8 is a functional block diagram of the elements of FIG. 6 and showing the temperature and pump condensation circuitry in detail.

Referring still to FIGS. 6 through 8 and particularly to FIG. 8, the circuitry for the temperature compensator 56 is shown in detail. The compensator circuit 56 generally comprises a first operational amplifier UA1 which is connected to a D.C. voltage source and the output of which is fed back into one of its input terminals through a resistor R11. The opposite input terminal of the amplifier is connected to ground through a resistor R12 and the capacitor C5 in parallel therewith. A double pole, triple throw switch SW1 is connected through one pole P1 to the input terminal of the operational amplifier UA1. The pole P1 is connectable to three terminals, one marked "O" representing group 0 type asphalt as hereinbefore set forth. The second pole labelled "1" representing group 1 type asphalt and the third pole labelled "E" representing emulsified asphalt. The pole P1 is connected to a positive voltage source through a resistor R13 a variable resistor VR1 and a control rectifier CR1 all in series. The terminal between the variable resistor VR1 and the control rectifier is connected to ground through a capacitor C6. The group 1 terminal of the P1 pole is likewise connected to the control rectifier CR1 through a a resistor R14 and a variable resistor VR2 connected in series therewith.

The P1 emulsified terminal E is likewise connected to the control rectifier CR1 through resistor R15 and a variable resistor VR 3 connected in series therewith.

The circuit also comprises a second operational amplifier UA2 having one of its inputs connected directly to the output of the amplifier UA1 through a resistor R16. The output of the amplifier UA2 is connected as a feedback through the second pole P2 of the switch SW1 and through one of three terminals marked 0, 1 or E and back into the input terminal between the amplifier UA2 and the resistor R16. The group 0 terminal is connected to the input of the amplifier UA2 through a resistor R17 and a variable resistor VR4 in series therewith. The group 1 terminal is connected to the input of amplifier UA 2 through a resistor R18 and a variable resistor VR5 connected in series therewith and the terminal E likewise is connected to the input of the amplifier UA2 through a resistor R19 and variable resistor VR6 connected in series therewith. The other input to the amplifier UA2 is connected to the output of the temperature probe means 42 through a resistor R20. The probe 42 is also connected to the base of the control rectifier CR1 through a resistor R21 and is connected to ground through a capacitor C7. The input terminal of the amplifier UA2 is also connected to ground through a capacitor C8.

It can therefore be readily seen that the amplifier UA1 has its input terminal connected to a fixed voltage set by voltage divider VR3, R13 and R12. The variable resistors VR1, VR2 and VR3 are for the purpose of low-end adjustment for each type of asphalt being moved. Therefore, since the feedback from the output of the amplifier UA1 is through a fixed resistor R11, the output of the amplifier UA1 would be a constant voltage representing the low end of the temperature scale.

On the other hand, the variable resistors VR4, VR5, VR6 represent the feedback loop for the amplifier UA2 and are therefore utilized for the purpose of adjusting the high end of the temperature scale for each type of asphalt which may be moved. Therefore, once the variable resistors VR1 through VR3 are adjusted, and the second group of resistors VR4 through VR6 are adjusted, the temperature span for the system is then set. The input signal from the temperature probe means 42 through the resistor R20 and into the amplifier UA2 then provides an output from the operational amplifier UA2 which is a voltage representing both the type of asphalt being metered and the temperature thereof. This output is provided directly into the count delete circuit 66 for temperature compensation in a manner that will be hereinafter set forth.

Located downstream of the digital counter and deletion circuit is an output control gate 70 which is located on the A1 board or as a part of the second processor. The function of the output control gate 70 is to pass a predetermined number of pulses and halt or delete a selected number of pulses out of the multiplier circuit 54 so that the resulting number of pulses will equal one corrected unit volume of asphalt regardless of the temperature of the asphalt. The output control gate is held "on" for passing pulses or "off" for stopping pulses by the deletion control circuit 68.

The deletion control circuit 68 which will be hereinafter more fully described is an R-s latch circuit which is set to pass pulses through the output control gate when a "stop delete" signal is received from the count delete circuits 64 and 66 and will disable the output control gate on receipt of a "start delete" signal from the digital counter circuit 62 or the count delete circuit 64 in a manner that will be hereafter set forth.

The digital counter 62 with this particular design may be referred to as a count 70 gate which will allow 70 pulses to pass through the output control vave 70. The 71st pulse will then disable the output control gate and the count delete circuit 64 then takes over to delete a suitable number of pulses required for calibrating the pump capacity. The count delete circuit 64 may sometimes be referred to as a count-98 circuit wherein a certain number of pulses from 10 to 59 may be deleted based on the size and type of pump being used for metering the asphalt. After a suitable number of pulses have been deleted, the count delete circuit 64 will then enable the output control gate through the deletion control circuit 68 to allow a number of pulses to pass representing the difference between 98 and the number of pulses deleted by the count delete circuit 64. After this number of pulses has passed through the output control gate a "start delete" signal is transmitted to the deletion control circuit and thereby again disabling the output control gate 70. At this time the count delete circuit 66 comes into play.

The count delete circuit 66 may be referred to herein as a count-32 circuit wherein the pulses from the multiplier circuit 54 are processed through a digital to analog converter and there compared to the output of the temperature compensator circuit 56 whereby a specific number of pulses will be deleted based on the temperature of the asphalt. This particular circuit is designed to delete from zero to 31 pulses, depending on the temperature and type of liquid asphalt and on the 32nd pulse a "stop delete" signal is transmitted to the deletion control circuit 68 and a reset pulse is supplied to the count 70 circuit whereby the output control gate 70 is again enabled starting the process over again by means of the count 70 circuit as will be hereinafter more fully set forth.

It is noted that the count-70 circuit is a constant counter for making the system compatible with the component selection. The count 70 circuit capability could be added to the count 32 circuit and is in effect so added.

Referring now in particular to FIG. 7 the circuit 62 referred to as the count-70 circuit generally comprises a binary counter BU1 having its input connected to the output of the multiplier circuit 54 through a pair of NOR gates U6 and U7. Both inputs of the NOR gate U6 are connected directly to the output of the multiplier circuit 54 and serves as an inverter. The output of the NOR gate U6 is connected to one input of a NAND gate U8 located in the output control circuitry 70. The output of the NOR gate U6 is connected to one input of the NOR gate U7. The other input of the NOR gate U7 is connected to the output of a NAND gate U9.

Another NAND gate U10 has its inputs connected together as an inverter and connected to one output of the binary counter BU1. A second NAND gate U11 has one of its inputs connected to a second output of the counter BU1 and its other input connected to a third output of the counter BU1 through a capacitor C9. These three outputs of the binary counter BU1 represent the number 70 in binary code. The outputs of the NAND gates U10 and U11 are applied as inputs to a NOR gate U12, with the output of the NOR gate U12 being connected to the deletion control circuit 68. The terminal between the capacitor C9 and the NAND gate U11 is connected to ground through a load resistor R21.

The count-98 or count delete circuitry 68 generally comprises a pair of decade counters DU1 and DU2, the DU1 counter for counting tens and the DU2 counter for counting digits. The input of the DU2 counter is connected to the output of the multiplier circuit 54 through a NOR gate U13 and the NOR gate U6, the output of the NOR gate U6 being connected at one of the inputs to the NOR gate U13. The decade counter DU2 is provided with a plurality of outputs representing the digits 0 through 9 which are connected as terminals to a single pole 10 throw switch SW2. The decade counter DU1 has five output terminals representing tens, 10 through 50, which are connected to the terminals of a single pole 5 throw switch SW3.

The circuit is provided with a NAND gate U14 which has one of its inputs connected to the 8 output of the decade counter DU2 and its other input connected to the 90 output of the decade counter DU1. A second NAND gate U15 has one input connected directly to the pole of the switch SW2 and the other input connected directly to the pole of the switch SW3. The output of the NAND gate U15 is provided to the deletion control circuitry 68.

The output of the NAND gate U15 is connected back to the other input of the NAND gate U13 through a NOR gate U16 which is connected as an inverter. The output of the NAND gate U14 is also provided as a first input to the NAND gate U9 of the count-70 circuit. The reset ports of the decade counters DU1 and DU2 are connected to the output of the NOR gate U12 of the count-70 circuit.

The count-32 circuit or count delete circuit 66 comprises a binary counter BU2 which has its input connected to the output of the multiplier circuit 54 through a NOR gate U17 and the NOR gate U6 which is connected as an inverter. The reset port of the binary counter BU2 is connected to the output of the inverter U16 through a capacitor C11 and to ground through a load resistor R23. The output of the NAND gate U14 and inverter U16 of the count-98 circuit is also provided to the deletion control circuit 68 through the capacitor C11.

The count-32 circuit also comprises an operational amplifier UA3 which acts as an analog comparator in a manner that will be hereinafter set forth. One of the inputs of the operational amplifier UA 3 is connected to the output of the temperature compensator circuit 56 through a resistor R24 and is connected to ground through a capacitor C12. The amplifier UA3 is also provided with both positive and negative voltage.

The second input to the amplifier UA3 is connected to the first 5 outputs of the binary counter BU2 through a network of resistors R25 through R34. The second input to the amplifier UA3 is connected to ground through the resistors 26 through 30, is connected to the 0 output of the binary counter BU2 through the resistors 26 through 29 and 34, to the 1 output through resistors R26 through R28 and R33, to the 2 output through resistors R26, R27 and R32, to the 3 output through resistors R26 and R31 and to the 4 output through resistor R25. It is readily seen that the combination of the binary counter BU2 and the resistors R25 through R30 constitute a digital-to-analog converter with a stepped output for each pulse received by the binary counter BU2. A sixth output of the binary counter BU2 representing 32 is provided to the second input of the NOR gate U17 and also the second input of the NAND gate U9 of the count 70 circuit and is also connected to the reset port of the binary counter BU1 of the count-70 circuit through a capacitor C13 and to ground through a resistor R35.

Referring now to the deletion control circuit 68 a pair of NAND gates U18 and U19 are connected back-to-back as an R-s latch circuit. The output of NAND gate U18 is connected as one input to the NAND gate U19 and the output of the NAND gate U19 being connected as one input of the NAND gate U18. The second input of the NAND gate U18 is connected to the output of the NOR gate U12 of the count-70 circuit through one input of a second NOR gate U20. The second input of the NOR gate U20 is connected to the output of the NAND gate U14 of the count-98 circuit through the inverter U16 of the capacitor C11. The second input of the NAND gate U19 is connected to the output of a NAND gate U21 which is connected as an inverter. The input of gate U21 is connected to the output of a NAND gate U22. One input of the NAND gate U22 is connected to the output of the NAND gate U15 of the count-98 circuit and the other input of the NAND gate U22 is connected to the output of the operational amplifier UA3 of the count-32 circuit through the resistor R36 and capacitor C14.

The output of the NAND gate U8 which is a part of the output control gate 70 is fed into a second NAND gate U23 which is connected as an inverter.

In operation, hot asphalt is pumped from the tank 12 by means of the asphalt drive pump 26 and is forced through the positive displacement meter pump 28 toward the three way valve 20. As the asphalt passes the temperature probe means 42 adjacent the meter pump 28, a voltage proportional to the temperature of the aphalt is provided at terminals F and G of the connector means 44. Also, as the asphalt travels through the meter pump 28a train of electrical pulses is emitted from the transducer 29B, the number and rate being directly proportional to the volume of hot asphalt being passed therethrough. This train of pulses is provided to terminal A of the connector means 44.

Referring now to FIGS. 6, 7 and 8, the type of asphalt selection switch SW1 is set on the type being utilized and for purposes of description the circuit shown in FIG. 8 shows the selector SW1 being set on the emulsified position E. The variable resistor VR6 is adjusted to set the high end of the scale for the emulsified type of asphalt and the variable resistor VR3 is adjusted to set the low end of the scale. The voltage from the temperature probe means 42 then is fed into the operational amplifiers UA1 and UA2 the output of which is a voltage level which is proportional to the temperature of the asphalt and is dependent on the type of asphalt. This voltage level is supplied then to the operational amplifier UA3 of the count 32 circuit as hereinbefore set forth.

The train of pulses from the meter pump 28 through terminal A of the connector means 44 then is applied to the wave shaper circuit 52 whereby the pulses are squared up, amplified and provided to the frequency multiplier circuit 54. The pulses are then multiplied by 32 in the frequency multiplier circuit 54 and provided through the inverter U6 to the output control circuit 70. The output control circuit at this point is in a "high" state thereby allowing the pulses to pass through the NAND gate U8 and into the binary counter BC2. Simultaneously the NAND gate U9 output is low, thereby allowing the pulses to pass through the NOR gate U7 into the binary counter BU1. It is readily seen that if the output of the NAND gate U9 is in the high state the NOR gates U13 through U17 will be disabled, thereby preventing any pulses from entering into the count-98 or the count-32 circuits. On the 70th pulse the binary counter BU1 will fill up, thereby providing enabling outputs to the NAND gates U10 and U11 whereby the 71st pulse which will be in the form of a spike will be sent through the NAND gates U10 and U11, through the NOR gate U12 and into the deletion control circuit for resetting the R-S latch whereby the output of the deletion control circuit will go low, thereby disabling the NAND gate U8 of the output control circuit 70. This will prevent further pulses from passing through the output control circuit from the frequency multiplier circuit 54. This 71st pulse will also be provided to the reset port of the decade counters DU1 and DU2 of the count 98 circuit. The outputs representing the number 98 from the DU1 and DU2 decade counters which were present at the NAND gate U14 are thereby removed causing the output of U14 to go high such signal being inverted by U16 which will in turn disable the NAND gate U9 thereby preventing any further entry of pulses into the count-70 circuit.

The switch SW2 and SW3 will have previously been set to delete a sufficient number of pulses to compensate for the capacity of the meter pump 28. For purposes of description the switches SW2 and SW2 are set on 33. The 71st pulse having caused the output of the inverter U16 to go "low" thereby enables the NOR gate U13 allowing pulses to enter the decade counters DU1 and DU2. When the decade counters fill to 33 which for this setting will be the 103rd pulse, an output spike will be provided from the poles of the switches SW2 and SW3 to the NAND gate U15 which will produce a negative spike into the NAND gate U22 of the deletion control circuit. The output of NAND gate U22 will therefore go high, the pulse being inverted by NAND gate U21, thereby causing the output of the R-S latch NAND gate U19 to go high which again enables NAND gate U8 of the output control circuit, thereby allowing pulses to start passing again through the output control circuit. The pulses will continue to pass through the circuit 70 and simultaneously into the decade counters DU1 and DU2 until the 98th pulse is received, at which time pulses will be provided to NAND gate U14 and the output of the NAND gate U14 will go "low," the signal being inverted by the NOR gate U16, the output of which will go "high." The output of the NOR gate U16 will be fed as a spike through the capacitor C11 and into the NOR gate U20 of the deletion control circuit thereby resetting the R-S latch and again disabling the output control circuit 70 which will prevent further pulses from passing through said circuit 70. The spike passing through the capacitor C11 also serves to reset the binary counter BU2 which had been previously filled to a count of 32 as will be hereinafter set forth. This resulting pulse will remove or cause the output of the last pin of the binary counter BU2 to go "low," which will serve to disable or maintain the count-70 circuit in a disabled condition since one of the input terminals of the NAND gate U9 will go low. This pulse also serves to enable the NOR gate U17 to allow pulses to then start entering binary counter BU2. As each pulse enters the binary counter BU2 the resistance network set up by the resistors R25 through R34 will cause the voltage level and the input to the operational amplifier UA3 to be stepped at one increment for each pulse received by the binary counter BU2.

The output of the operational amplifier UA3 will remain high until the stepped voltaage from the binary counter BU2 exceeds the voltage level present at the other input terminal from the temperature compensation circuit at which time the output of the operational amplifier UA3 will go low, thereby causing a negative spike to cross the capacitor C14 and into the NAND gate U22 of the deletion control circuit. This will cause the output of the NAND gate U22 to go "high" and the output of U21 to go "low," thereby causing the R-S latch to switch to "high" which in turn allows pulses to pass through the output control circuit 70. The pulses will continue to pass through the output control circuit 70 until the binary counter BU2 is filled with 32 pulses, at which time the 6th output terminal which represents 32 from the binary counter BU2 is provided to the NOR gate U17 thereby blocking any further signals from entering the counter BU2. The signal also serves to enable the NAND gate of the count-70 circuit and to reset the binary counter BU1 in that same circuit.

At this point the count-70 circuit will start passing pulses into the binary counter BU1 and simultaneously through the output control circuit 70 whereby the process will be repeated. For each 4 pulses entering the binary counter BC2 an output pulse is transmitted to the optional digital-to-analog converter A4 for subsequent analog output and recorder output. Simultaneously, for every 32 pulses counted into the binary counter BC2 one output pulse is provided directly into the rate multiplexer circuit A3 whereby the rate is continuously measured and may be displayed digitally by the decoder circuit A6. Simultaneously the pulses which are divided by 32 will be provided into a decade counter DC1 whereby they are divided again by 10, the output of the counter DC1 being provided at one input to the NAND gate U6.

The opposite input terminal for the NAND gate U6 is connected to the three way valve switch 46 and if the valve 20 is positioned to flow asphalt into the mixer then a signal will be provided at H enabling the NAND gate U6 to pass the pulses frm the decade counter DC1 into the total multiplexer A2. These pulses will then be totalled in the multiplexer and may be displayed at the option of the operator by the decoder circuit A6. Further, it is noted that the total multiplexer A2 is also directly connected to the standby power source which is a battery powered source whereby if there is a loss of power in the system, power will be maintained by the battery 50 to the A2 total multiplexer circuit to maintain the total number of gallons present in the A2 memory.

From the foregoing, it is apparent that the present invention teaches a novel pumping and metering system for providing accurate measurement of flow of liquid asphalt. Accuracy is obtained by both using a positive displacement pump as a metering device and by providing compensation for variable parameters, such as temperature of the asphalt being metered.

Whereas, the present invention has been described in particular relation to the drawings attached hereto, it is apparent that other and further modifications apart from those shown or suggested herein may be made within the spirit and scope of this invention.

What is claimed:
1. A liquid pumping and metering system comprising:
a. a first positive displacement pump having a rotatable portion, an inlet port and an outlet port, said inlet port being connected to a liquid source;
b. a second positive displacement pump having a rotatable portion responsive only to viscous liquid flow, an inlet port and an outlet port, said outlet port being connected directly to the outlet port of the first pump, whereby liquid from the first pump may be flowed through the second pump in a reverse direction;
c. a rotational power source operably connected to the rotatable portion of the first pump for pumping liquid through said first pump and into the outlet portion of the second pump;
d. meter means operably connected to the rotating portion of the second pump for measuring the flow of liquid through said second pump, said flow of liquid causing rotation of the rotatable portion of said second pump.

2. A liquid pumping and metering system comprising:
a. a first positive displacement pump having a rotatable portion, an inlet port and an outlet port, said inlet port being connected to a liquid source;
b. a second positive displacement pump having a rotatable portion, an inlet port and an outlet port, said outlet port being connected to the outlet port of the first pump, whereby liquid from the first pump may be flowed through the second pump in a reverse direction;
c. a rotational power source operably connected to the rotatable portion of the first pump for pumping liquid through said first pump and into the outlet portion of the second pump;
d. meter means operably connected to the rotating portion of the second pump for measuring the flow of liquid through said second pump, said flow of liquid causing rotation of the rotatable portion of said second pump;
e. digital processing means operably connected to the meter means for processing and displaying the amount and rate of flow of liquid through the second pump; and including,
f. a variable input parameter device connected to the digital processing means, the output of said device being a voltage proportional to that parameter and wherein the digital processing means comprises a signal processor means which is operably connected to the second meter means, said signal processor means including means for correcting the flow volume of the liquid in accordance with the variable input parameter;
g. a rate multiplexer circuit operably connected to the output of the signal processor means for computing rate of flow through said second pump;
h. a total multiplexer circuit operably connected to the output of the signal processor means for computing the cumulative volume of liquid passed through the second pump;
i. data display means operably connected to the outputs of the rate multiplexer circuit and the total multiplexer circuit for displaying rate of flow and cumulative flow of liquid through said second pump.

3. Liquid pumping and metering system as set forth in claim 2 wherein the signal processor means comprises an output control gate operably connected between the output of the meter means and the rate and total multiplexer circuits, a deletion control circuit operably connected to the output control gate for intermittently opening and closing said output control gate, digital counter means operably connected between the deletion control circuit and the outputs of the meter means and the variable input parameter device for repeatedly counting the predetermined number of pulses and including a means for providing opening and closing commands to the deletion control circuit for deleting a portion of each predetermined number of pulses for compensating for the variable input parameter.

4. A liquid pumping and metering system as set forth in claim 3 wherein the means for providing opening and closing demands to the deletion control circuit comprises a digital-to-analog converter for providing a stepped increased voltage output for each pulse received from the meter means, said digital-to-analog converter being connected to the output of the meter means, an analog comparator having its output connected to the deletion control ciruit, one end of said analog comparator being connected to the output of the digital-to-analog converter and the other input being connected to the output of the input parameter device whereby a closing command is provided to the deletion control circuit until the stepped increase voltage output from the digital-to-analog converter exceeds the voltage from the temperature probe means at which time an opening command is provided to the deletion control circuit.

5. A liquid pumping and metering system as set forth in claim 4 wherein the digital-to-analog converter comprises a digital counter, a network of resistors operably connected between the output of said digital counter and the input of the analog comparator, and reset means operably connected to said digital counter for intermittently clearing said counter.

6. A liquid pumping and metering system as set forth in claim 5 wherein the digital counting means includes a second means for providing opening and closing commands to the deletion control circuit said second means comprising a second digital counter, the output thereof being connected to the deletion control circuit through a selector switch, gating means operably connected between the digital counters of the first and second means and the meter means for alternately filling one counter and then the other, wherein said reset means is connected to both counters for alternately clearing one counter and then the other.

7. A liquid pumping and metering system as set forth in claim 6 wherein the deletion control circuit comprises an R-S latch having gated inputs from the digital counter means.

8. A liquid pumping and metering system as set forth in claim 2 wherein the variable input parameter device is a temperature probe means comprising an RTD probe located adjacent the second positive displacement pump in communication with the liquid flow therethrough, a temperature compensating circuit electrically connected between the RTD probe and the signal processor means for providing a voltage level to said signal processor means which is proportional to the temperature of the liquid flow.

9. A liquid pumping and metering system as set forth in claim 8 wherein the temperature compensator circuit comprises signal amplification means operably connected to the RTD probe, a plurality of selectable feedback resistor paths connected to the amplification means for both high and low adjustment of the amplification means and selector switch operably connected to each feedback resistor path for selecting a desired resistance path depending on the type of liquid being pumped through the second pump.

10. A liquid pumping and metering system as set forth in claim 2 including gating means operably connected to the total multiplexer for selectably disabling said total multiplexer.

11. A liquid pumping and metering system as set forth in claim 2 wherein said liquid processor includes an interfacing circuit connected to the output of the meter means for conditioning the pulse train for processing.

12. A liquid pumping and metering system as set forth in claim 11 wherein the interfacing circuit includes a pulse frequency multiplexer for multiplying each pulse by a predetermined constant.

13. A liquid pumping and metering system comprising:
 a. a first positive displacement pump having a rotatable portion, an inlet port and an outlet port, said inlet port being connected to a liquid source;
 b. a second positive displacement pump having a rotatable portion, an inlet port and an outlet port, said outlet port being connected directly to the outlet port of the first pump, whereby liquid from the first pump may be flowed through the second pump in a reverse direction;
 c. a rotational power source operably connected to the rotatable portion of the first pump for pumping liquid through said first pump and into the outlet portion of the second pump;
 d. meter means operably connected to the rotating portion of the second pump for measuring the flow of liquid through said second pump, said flow of liquid causing rotation of the rotatable portion of said second pump;
wherein the meter means comprises data processing means for converting the measured flow of liquid to usable quantities, and including a variable input parameter means operably connected to the data processing means, said data processor means including means for correcting the flow measurement of liquid in accordance with the variable input parameter.

14. A liquid pump and metering system as set forth in claim 13 wherein the variable input parameter means comprises a temperature sensing means operably connected between the outlet ports of the first and second positive displacement pump.

* * * * *